3,496,116
CATALYST MANUFACTURE
Robert F. Anderson, Lyons, and Kenneth D. Vesely, La Grange Park, Ill., assignors to Universal Oil Products Company, Des Plaines, Ill., a corporation of Delaware
No Drawing. Filed Feb. 13, 1967, Ser. No. 615,324
Int. Cl. B01j 11/44, 11/40; C10g 11/04
U.S. Cl. 252—453                                   5 Claims

ABSTRACT OF THE DISCLOSURE

A method of manufacturing thermally stable silica-alumina micro-spheroidal catalytic particles for the fluid catalytic cracking of petroleum hydrocarbons.

Background of the invention

Numerous materials of natural and synthetic origin have the ability to catalyze the cracking of heavy petroleum fractions to form more useful lower boiling products. However, the mere ability to catalyze the cracking reaction is not sufficient to afford a catalyst of commercial significance in a highly competitive market. Of the presently accepted catalysts, those comprising a composite of silica and alumina have been the most widely used.

Modern fluid catalytic cracking operations, wherein a fluidized mass of micro-spheroidal silica-alumina particles is continuously circulated between a hydrocarbon conversion zone and a regeneration zone, employ relatively severe reaction and regeneration temperatures which have a deactivating influence on the catalyst particles. The capacity to maintain activity upon exposure to severe temperature conditions is referred to herein as thermal stability. It is known that the activity of solid amorphous catalysts such as herein contemplated is strongly influenced by the particular pore structure thereof which is generally described in terms of average pore volume and average pore diameter. It has been observed that, for a given average pore volume, as the number of pores with a diameter in the 300–500 Angstrom range increases the thermal stability of the catalyst likewise increases and the catalyst is consequently more effective in the cracking process. Catalysts will invariably comprise a substantial number of pores which lie outside this effective range which are conducive to thermal deactivation of the catalyst. It will be seen that while two or more catalysts may be characterized by the same average pore volume and average pore diameter, this does not necessarily mean that, all other things being equal, said catalysts are equivalent as to thermal stability. For example, one catalyst may comprise a larger number of pores within the effective range without disturbing the average pore volume or average pore diameter and thus exhibit an improved thermal stability. It is intended by the process of this invention to increase the number of pores which have a pore diameter within the effective range and thus improve the thermal stability of silica-alumina cracking catalysts.

Generally, in the commercial manufacture of silica-alumina cracking catalysts, the pore structure of the catalyst is developed initially in the preparation of the silica portion of the catalyst, the silica gel being thereafter impregnated with aluminum sulfate which is subsequently hydrolyzed to the desired alumina. Thus, sodium silicate (water glass) is acidified in aqueous solution to form a silica sol. The pore structure of the final catalyst composite is established by an acid aging of the acidified water glass followed by a basic or alkaline aging. Thus, the acidified water glass solution is allowed to age at the acidic conditions and polymerize to a complex polysilicic acid. The resulting slurry is thereafter adjusted to an alkaline pH and further aged for a time sufficient to develop an optimum pore structure. The pore structure having been established, the mixture is adjusted to a pH of about 3.5 and impregnated with an aluminum sulphate solution as an alumina source, the aluminum sulphate being thereafter hydrolyzed by the addition of a basic reagent, usually ammonium hydroxide, to the acidic slurry. The resulting gel composite is then filtered, reslurried in water and spray dried. The spray dried particles are then washed free of soluble salts and dried.

Summary of the invention

In one of its broad aspects, the present invention embodies a process for the manufacture of micro-spheroidal silica-alumina catalytic particles which comprises commingling an acidified water glass solution, an alumina source and an ammonia precursor which is decomposable to ammonia with time and temperature, said acidified water glass solution having a pH of from about 1 to about 3, and said alumina source being selected from the group consisting of an alumina sol and an aluminum salt solution and having a pH of from about 1 to about 3, effecting gelation of the resulting mixture and aging the gelation product at an elevated temperature effecting the decomposition of the residual ammonia precursor contained therein, washing the soluble salts from the aged gel, preparing the washed gel in aqueous slurry and spray drying the same. Other objects and embodiments of this invention will become apparent in the subsequent detailed specification.

Pursuant to the process of this invention, an acidified alkali metal silicate solution is commingled with an alumina source and an ammonia precursor in the initial step of a series of process steps. The acidified alkali metal silicate is available by conventional methods of preparation. The alkali metal silicate most often employed is an aqueous sodium silicate solution commercially available as "water glass." Acidification with a small amount of acid such as hydrochloric acid, sulfuric acid, etc., effects hydrolysis of the water glass and conversion thereof to a silicic acid or a silica sol. The water glass is usually diluted with water and added to the acid in a diluted state, the final pH being from about 1 to about 3. To obviate polymerization of the silicic acid and premature gelation thereof, the temperature is maintained below about 100° F.

An aluminum salt or an alumina sol is suitably employed as a source of alumina. In the former case, an aluminum salt which is hydrolyzable to an alumina sol is suitable. Thus, the acidified water glass can be commingled with an aqueous solution of a suitable aluminum salt, preferably aluminum sulphate but also including aluminum chloride, aluminum nitrate, aluminum alcoholate, and the like, which is hydolyzable to an alumina sol at the conditions described herein.

In a preferred embodiment an alumina sol is utilized as an alumina source. It is well known that an alumina hydrosol may be prepared from certain compounds of alumina such as the aforementioned aluminum salts. Of these, aluminum chloride as hereinafter set forth, is most generally employed as the source of alumina and the subsequent description of the process of this invention is therefore presented with reference to aluminum chloride hydrosols although it is understood that aluminum hydrosols in general may be employed. The aluminum chloride hydrosol may be prepared in any conventional or convenient manner, one typical method being to commingle aluminum pellets with deionized water and adding thereto an acidic reagent such as dilute hydrochloric acid and/or aluminum chloride sufficient to attain a final pH of from about 1 to about 3. The aluminum, utilized in a large excess, is suitably digested at about reflux temperature of the reaction mixture—usually a temperature of from 175° F. to about 220° F. depending upon the particle size and purity of the aluminum employed. To avoid premature gelation of the alumina hydrosol it is desirable to maintain the alumina concentration thereof at less than about 35 weight percent.

A suitable ammonia precursor may be described as a weakly basic material which is substantially stable at normal temperatures but hydrolyzable or decomposable to ammonia with increasing temperature, the rate of hydrolysis increasing with temperature. Certain organic amines, particularly urea, hexamethylenetetramine, and mixtures thereof, are suitable ammonia precursors. Thus, the ammonia precursor can be commingled with the alumina sol and the acidified water glass at normal temperatures without effecting any substantial degree of gelation. While gelation of the mixture will occur with time, upon heating the mixture, preferably at a temperature of from about 120° F. to about 220° F., co-gelation of the silica and the alumina is accelerated although not necessarily at the same rate, the silica being set thermally and the alumina being set chemically by the gradual release of ammonia from the decomposing ammonia precursor. The ammonia precursor, which is preferably urea, is employed in an amount which is dependent upon the anion concentration of the silica sol-alumina sol mixture. Thus, where the alumina source is an alumina sol prepared by digesting aluminum in hydrochloric acid and the water glass is acidified with hydrochloric acid, the quantity of urea or other ammonia precursor is dependent upon the concentration of chloride ion in the resulting mixture. The ammonia precursor is utilized in an amount to furnish, upon total decomposition or hydrolysis, from about 1 to about 1.5 equivalents of ammonia per equivalent of anion present in the mixture, in other words, sufficient to effect from 100% to about 150% neutralization.

Only a fraction of the ammonia precursor is hydrolyzed or decomposed to ammonia in the relatively short period during which initial gelation occurs. During this subsequent aging process, the residual ammonia precursor retained in the gel continues to hydrolyze to ammonia and to effect further polymerization of the silica-alumina whereby improved pore volume/pore diameter relationships of the gel are established which have been shown to be conducive to improved thermal stability of the finished catalyst. Aging of the gel is suitably accomplished in about 10 to about 24 hours. The aging process is effected at an elevated temperature of from about 120° F. and preferably to about 220° F. although higher temperatures may be employed. The aged gel is then washed free of soluble salts preferably with water containing a small amount of ammonium hydroxide and/or ammonium nitrate.

Subsequent to the water washing procedure, the aged and washed product is reslurried with water to a smooth consistency and subjected to spray drying whereby the aqueous slurry is sprayed in an atomized state into an atmosphere of hot inert gases to effect a rapid evaporation of moisture so that dried particle of perdetermined size range fall out of the spray. The composite material is then dried, usually at a temperature of about 300° F. to about 700° F.

One preferred method of forming the aforesaid silica-alumina gel which is adaptable to batch, semi-continuous or continuous type of operation, comprises commingling the acidified water glass with the alumina sol and ammonia precursor substantially immediately prior to dispersing the mixture as droplets or globules, preferably of about 120–150 microns in size, in a hot oil bath maintained at the desired temperature whereupon the desired gelation occurs. The gelation and aging can be accomplished in the same oil media using the same or different vessels. In any case, the aged product is recovered and water washed to separate soluble salts therefrom. The washed material is then dried, the particle size being thereby reduced—in the preferred instance to about 50–75 microns in diameter.

Silica-alumina composites can be prepared in accordance with the method of this invention to comprise silica and alumina in weight ratios conventionally employed in silica-alumina cracking catalysts, for example, weight ratios of from about 37/63 to about 87/13.

The micro spheroidal silica-alumina catalytic particles prepared in accordance with the method of this invention are an active catalyst for cracking hydrocarbons, for example, relatively high molecular weight hydrocarbons to form products of relatively lower molecular weight useful as a motor fuel. Other typical uses of this alumina-silica composite, for example, is in the polymerization of olefins, particularly olefins of relatively low molecular weight such as ethylene, propylene, butylenes, etc., and as a catalyst for alkylating aromatic hydrocarbons with long or short chain olefins. The catalysts herein prepared are especially desirable for the above hydrocarbon conversion reactions because of their porous structure and subsequent low density, making the catalyst especially advantageous for use in the fluidized processes.

The following examples are presented in further illustration of the process of this invention and of the advantages resulting therefrom. The examples are not intended to serve as an undue limitation of the generally broad scope of the invention as set out in the appended claims.

EXAMPLE I

The catalyst of this example represents a commercial catalyst prepared in the conventional manner. The catalyst is presented as a reference catalyst to demonstrate the thermal stability characteristic of the catalyst prepared in accordance with the process of this invention. A water glass solution was acidified to a pH of about 3.5 with dilute sulfuric acid and allowed to age for about 3 hours. The resulting gel slurry was then adjusted to a pH of about 7 with an aqueous ammonia solution and further aged for about 1.5 hours. The slurry was thereafter adjusted to a pH of about 3.5 with dilute sulfuric acid and impregnated with sufficient aluminum sulfate in aqueous solution to yield a final composite having a composition of 12 weight percent alumina and 88 weight percent silica. The aluminum sulfate was then hydrolyzed by adding aqueous ammonia to a pH of about 7. The resulting gel composite was filtered, reslurried in water and spray dried. The spray dried material was then washed free of soluble salts, dried, and calcined at 1112° F. for 2 hours.

Two samples of the reference catalyst were taken, the first sample being tested for activity, as hereinafter described, without further treatment, the second sample being first dried for 2 hours at 400° F., then calcined at 1112° F. for 2 hours and at 1652° F. for 6 hours. Catalyst activity was determined by passing a Midcontinent gas oil over each of the catalysts in a fixed bed and measuring the conversion to gasoline and gas. The volume percent activity was determined as the ratio of the liquid hourly space velocity (LHSV) used with the thermally treated catalyst sample to that required with the untreated sample to attain the same conversion, said ratio being multiplied by 100 (the activity arbitrarily assigned to the untreated sample) to give a volume activity expressed as a percentage. This number was converted to a weight percent activity by multiplying the same by the ratio of untreated catalyst density to thermally treated catalyst density.

In determining the thermal stability of the catalysts of Examples 2 and 3, the catalysts were first thermally treated in the manner described above. Thereafter, their weight activities were determined with respect to the untreated reference catalyst in the manner described. The thermal stability of each of the catalysts is then taken as the ratio of the test sample weight percent activity to that of the thermally treated reference sample expressed as a percentage.

EXAMPLE II

In the preparation of a silica-alumina catalyst according to the process of this invention, a water glass solution containing 16 weight percent silica was acidified with dilute hydrochloric acid to a pH of about 2. To the resulting sol was added a 40 weight percent aqueous urea solution (sufficient to effect about 150 mole percent neutralization of the total free chloride). This mixture was then admixed with an alumina sol in a ratio to yield a composite comprising 63 weight percent alumina and 37 weight percent silica. The alumina sol contained 13.5 weight percent aluminum and was prepared by digesting aluminum pellets in dilute hydrochloric acid, the pH of the sol being about 2. Gelation was accomplished by dispersing the mixture in a hot (217° F.) oil bath and the resulting gel particles were retained in said bath at said temperature and aged for 24 hours. The aged gel particles were recovered, water-washed for 8 hours at about 200° F., ground and reslurried in water and spray dried. The catalyst had a thermal stability of 184.

EXAMPLE III

It will be observed that the catalyst of Example II, prepared in accordance with the process of this invention, has a somewhat larger ratio of alumina to silica than does the commercial catalyst of Example II. Therefore, a catalyst was prepared in substantially the same manner as described in Example I with the exception that sufficient aluminum sulfate was employed to yield a final composite having a composition of 63 weight percent alumina and 37 weight percent silica. The catalyst had a thermal stability of 92. This example then illustrates that the improved thermal stability of the catalyst prepared in accordance with the process of this invention is not attributable to the particular ratio of alumina to silica employed therein, but to the method of preparation herein disclosed.

We claim as our invention:

1. A process for the manufacture of silica-alumina catalytic particles which comprises:
    (a) commingling an acidified water glass solution, an alumina source and an aqueous solution of urea which is decomposable to ammonia with time and temperature, said water glass solution having a pH of from about 1 to about 3, and said alumina source being selected from the group consisting of an alumina sol and an aluminum salt solution and having a pH of from about 1 to about 3,
    (b) effecting gelation of the resulting mixture and aging the gelation product at an elevated temperature effecting decomposition of the residual urea contained therein,
    (c) washing the soluble salts from the aged gel and
    (d) preparing said gel in aqueous slurry and spray drying the same.

2. The process of claim 1 further characterized with respect to step (a) in that said alumina source is an alumina sol.

3. The process of claim 2 further characterized with respect to step (b) in that said gelation is effected at a temperature of from about 120° F. to about 220° F.

4. The process of claim 3 further characterized with respect to step (b) in that said gelation product is aged at a temperature of from about 120° F. to about 220° F.

5. The process of claim 4 further characterized with respect to step (a) in that said urea is utilized in an amount to effect from about 100% to about 150% neutralization of the mixture.

References Cited

UNITED STATES PATENTS

| | | | |
|---|---|---|---|
| 2,723,243 | 11/1955 | Holden | 252—453 X |
| 2,872,410 | 2/1959 | Erickson | 252—453 X |
| 3,294,659 | 12/1966 | O'Hara | 252—453 X |

DANIEL E. WYMAN, Primary Examiner

C. F. DEES, Assistant Examiner

U.S. Cl. X.R.

252—455